United States Patent
Linnartz et al.

(10) Patent No.: US 6,574,349 B1
(45) Date of Patent: Jun. 3, 2003

(54) EMBEDDING AND EXTRACTING SUPPLEMENTAL DATA IN AN INFORMATION SIGNAL

(75) Inventors: Johan P. M. G. Linnartz, Eindhoven (NL); Franciscus L. A. J. Kamperman, Eindhoven (NL); Erwin Kragt, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/441,948

(22) Filed: Nov. 17, 1999

(30) Foreign Application Priority Data

Nov. 17, 1998 (EP) .............................. 98203899

(51) Int. Cl.[7] .............................. G06K 9/00; G06K 9/66
(52) U.S. Cl. ........................ 382/100; 382/190; 382/194
(58) Field of Search .......................................... 382/100

(56) References Cited

U.S. PATENT DOCUMENTS 5,305,243 A * 4/1994 Ayraud et al. .................. 708/5
5,623,431 A * 4/1997 Clemow ......................... 708/5
5,719,937 A    2/1998 Warren et al. ................. 380/4
6,330,673 B1 * 12/2001 Levine ........................ 713/176

FOREIGN PATENT DOCUMENTS

GB          002226718      *  4/1990    ........... G11B/27/00

* cited by examiner

Primary Examiner—Leo Boudreau
Assistant Examiner—Hussein Akhavannik
(74) Attorney, Agent, or Firm—Michael E. Belk

(57) ABSTRACT

Supplemental data is embedded in an information signal such as a sigma-delta modulated audio signal. The encoded signal includes two or more channels, e.g. a left channel bit stream and a right channel bit stream. The same supplemental data is accommodated at corresponding predetermined bit positions, e.g. every Mth bit position, of the bit streams. This allows detection and extraction of the supplemental data without the need for accommodating a sync pattern in the signal. At the receiving end, a sequence of Mth bits from the first channel is compared with a corresponding sequence of Mth bits from the second channel. If they are identical, the sequence is a candidate supplemental data sequence. This is done for different sequence positions until the supplemental data has been found.

6 Claims, 3 Drawing Sheets

EMBEDDING AND EXTRACTING SUPPLEMENTAL DATA IN AN INFORMATION SIGNAL

FIELD OF THE INVENTION

The invention relates to a method and arrangement for embedding supplemental data in an information signal, comprising the step of embedding supplemental data samples at predetermined positions of said information signal. The invention also relates to a method and arrangement for extracting the supplemental data from such an information signal.

BACKGROUND OF THE INVENTION

There is a growing need to accommodate watermarks in audio and video signals. Watermarks are supplemental data messages embedded in multimedia assets, preferably in a perceptually invisible manner. They comprise information, for example, about the source or copyright status of documents and audiovisual programs. They can be used to provide legal proof of the copyright owner, and allow tracing of piracy and support the protection of intellectual property.

A known method of embedding supplemental data in an information signal as defined in the opening paragraph is disclosed, inter alia, in International Patent Application WO-A-98/33324. In this prior-art method, a watermark pattern is embedded in a (sigma-)delta-modulated audio signal. The watermark is embedded in the encoded audio signal by modifying selected bits thereof. For example, every $100^{th}$ bit is replaced by a bit of the watermark pattern. The step of modifying the encoded audio signal is carried out inside the feedback loop of the encoder so as to compensate the effect of the modification in subsequent encoding steps.

The prior-art method is envisaged for recording high-quality audio on the audio version of the Digital Versatile Disk (DVD). A sampling frequency of 2,822,400 Hz (64*44,100) will be used to yield a signal-to-noise ratio of 115 dB. Replacing every $100^{th}$ bit of the sigma-delta-modulated audio signal by a watermark bit at the expense of only 1 dB increases the quantization noise. This corresponds to watermark bit rate of about 28000 bits per second.

The above-mentioned patent application WO-A-98/33324 also discloses an arrangement for extracting the watermark. A synchronization bit pattern (hereinafter sync pattern for short) is accommodated in the bit stream to identify the supplemental data bit positions. The arrangement comprises a divider stage and a sync detector. The divider stage divides the bit rate by the number of bits by which the watermark bits are spaced apart (e.g. 100 if every $100^{th}$ bit of the signal is a supplemental data bit). The sync detector changes the phase of the divider stage until the sync pattern is found. Such a sync detector includes a relatively long shift register or serial-to-parallel converter to store a portion of the bit stream. If every $M^{th}$ bit of the signal is a supplemental data bit and the sync pattern comprises N bits, the sync detector must necessarily store (N−1)·M+1 bits.

German Patent Application DE-A-37 17 315 discloses such a known sync detector in more detail. In this publication, every $15^{th}$ bit of a signal is a supplemental bit and the sync pattern is a 4-bit word. In accordance therewith, the shift register (serial-to-parallel converter 5 in FIG. 2 of DE-A-37 17 315) holds 46 bits.

In order to reduce the length of the shift register, it is proposed in Applicant's non-published co-pending patent application PHN 17.148 to make the spacing between the sync pattern bits considerably smaller than the spacing between the watermark bits. However, this solution affects the coding performance and increases the signal-to-noise ratio of the sigma-delta modulator.

SUMMARY OF THE INVENTION

It is an object of the invention to provide a method of embedding supplemental data in an information signal, which allows the supplemental data bit positions to be detected in an alternative manner.

To this end, the method in accordance with the invention is characterized in that the information signal comprises at least two signal channels, the method including the step of embedding the same supplemental data samples at corresponding positions of said channels. The transmission of a sync pattern can now be omitted because the position of the embedded watermark bits can easily be found by searching the positions in which the at least two channel samples are identical.

The corresponding method of extracting the supplemental data from the information signal comprises the steps of comparing a first sequence of predetermined first channel signal samples with a corresponding second sequence of second channel signal samples, displacing said first and second sequence by one sample position, and repeating said comparison step for said displaced first and second sequence as long as the sequences are not identical.

DESCRIPTION OF A PREFERRED EMBODIMENT

Figure 1:
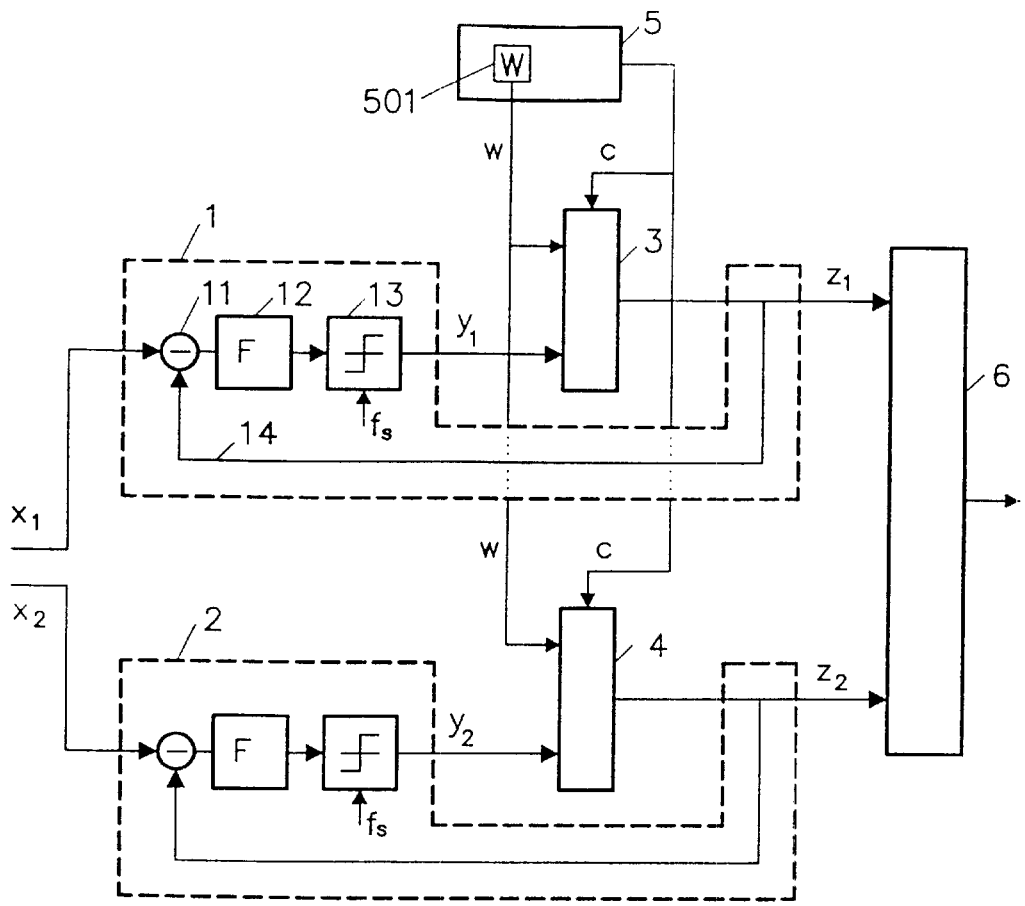
FIG. 1 shows a schematic diagram of a preferred embodiment of an arrangement for embedding supplemental data in a sigma-delta-modulated audio signal in accordance with the invention.

The invention will be explained with reference to FIG. 1, which shows a schematic diagram of a preferred embodiment of an arrangement for embedding supplemental data in a sigma-delta-modulated audio signal in accordance with the invention. The arrangement receives a stereo audio signal comprising a left channel signal $x_1$ and a right channel signal $x_2$. The channels $x_1$ and $x_2$ are applied to conventional sigma-delta modulators 1 and 2, respectively. Both sigma-delta modulators are identical so that only one of them will be described.

Sigma-delta modulator 1 comprises a subtracter 11, a loop filter 12, a polarity detector 13 and a feedback path 14. The subtracter 11 subtracts the encoded output signal $z_1$ (having a level of +1V or −1V) from the input signal $x_1$. The loop filter 12 filters the difference signal. The filtered signal is applied to the polarity detector 13 which produces, at a rate determined by a sampling frequency $f_s$, an encoded signal $y_1$ having the bit value "1" (+1V) or "0" (−1V).

Figure 2:
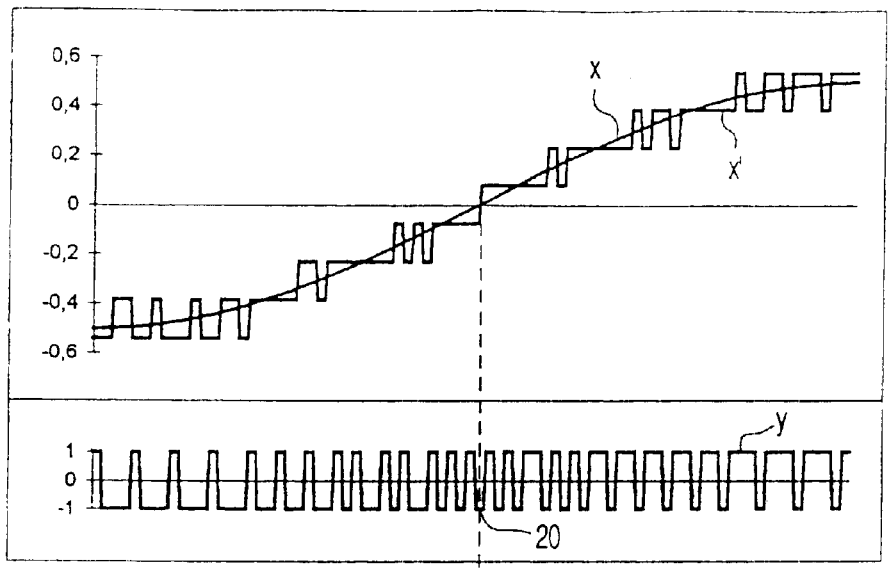
FIGS. 2 and 3 show waveforms to illustrate the operation of the sigma-delta modulators that are shown in FIG. 1.

FIG. 2 shows waveforms to explain the operation of the conventional sigma-delta modulator. More particularly, the Figure shows an input signal x and the encoded signal y. The sigma-delta modulator produces more positive samples as the input signal becomes larger. As the Figure shows, an input voltage of −0.5V is encoded as a bit sequence 0001 (three −1V pulses and one +1V pulse), an input voltage of 0V is encoded as a high-frequency bit pattern 01010 (alternating −1V and +1V pulses), and an input voltage of +0.5V is encoded as a bit sequence 1110 (three +1V pulses and one −1V pulse).

The encoded signal is decoded at the receiving end by reshaping the received pulses and passing them through a low-pass filter. In this simplified example, it is assumed that the encoded signal is demodulated by averaging 13 samples of the signal. The demodulated signal x' is also shown in FIG. 2, apart from a time delay caused by said low-pass filter operation. In the Figure, the demodulated signal x' is thus time-aligned with the input signal x.

Modification circuits 3 and 4 are connected between the polarity detector 13 and the feedback path 14 of the respective sigma-delta modulators. In response to a control signal c delivered by a control circuit 5, the modification circuits (multiplexers) replace every $M^{th}$ bit of the encoded signals $y_1$ and $y_2$ by a watermark bit w. The modified encoded signals $z_1$ and $Z_2$ are combined by a multiplexer 6 to form a single bit stream for transmission to a receiver or recording on a storage medium. The watermark message W is stored in a register 501 of the control circuit 5. It is important to note that the same watermark W is applied to both modification circuits 3 and 4.

Figure 3:
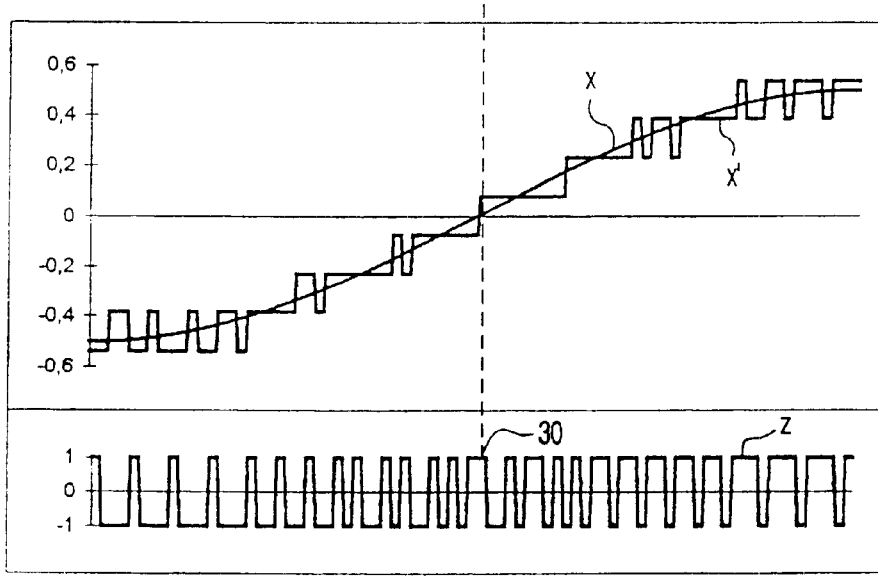

FIG. 3 shows waveforms to explain the operation of the sigma-delta modulator if the respective modification circuit is active. The Figure shows the same input signal x as shown in FIG. 2 and the modified encoded signal z. In the example, a "−1" sample 20 (FIG. 2) of the encoded signal y has been replaced by a "+1" sample 30 so as to represent a watermark bit w=1. Because the modification is fed back to the input, the adverse effect of the modification will subsequently be compensated by the encoding stage. Thus, a portion of the output signal z immediately following the supplemental data bit 30 differs from the corresponding portion shown in FIG. 2. In accordance therewith, the demodulated signal x' in FIG. 3 is also temporarily different from the same signal in FIG. 2. Note that the time alignment in the Figures causes the difference to become already manifest before the supplemental data bit is embedded.

As will be appreciated from a comparison of FIGS. 2 and 3, the difference is hardly noticeable in practice. A sigma-delta modulator for encoding high-quality audio signals at a sampling frequency $f_s$=2,822,400 Hz (64*44,100) has a signal-to-noise ratio of 115 dB. It has been found that replacing 1 sample per 100 samples increases the quantization noise by only 1 dB.

Figure 4:
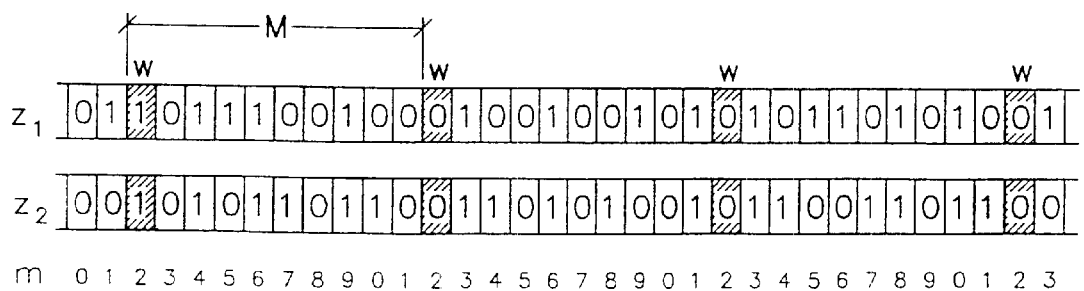
FIG. 4 shows waveforms to illustrate the operation of the arrangement for embedding supplemental data in a signal in accordance with the invention.

FIG. 4 shows a simplified example of a multi-channel audio bit stream which is produced by the arrangement shown in FIG. 1. In this simple example, every $10^{th}$ bit of the channel bit streams $z_1$ and $z_2$ is a supplemental data bit. The embedded watermark data bits w are shaded in the Figure. They are the same in both channels. The encoded signal bits are generally not the same. This is even true in practice if the audio signal is a mono signal. The bit positions m within each series of M bits are numbered 0 . . . M−1.

It will be appreciated that it is the objective of a receiver arrangement to identify the bit position of the supplemental data bits (m=2 in FIG. 4). This is accomplished by searching the bit positions of the multi-channel bit stream in which the signal samples $z_1$ and $z_2$ are identical. Once this objective has been formulated, an arrangement for searching these bit positions can easily be designed by a person skilled in the art. For illustration, two embodiments will now be described.

Figure 5:
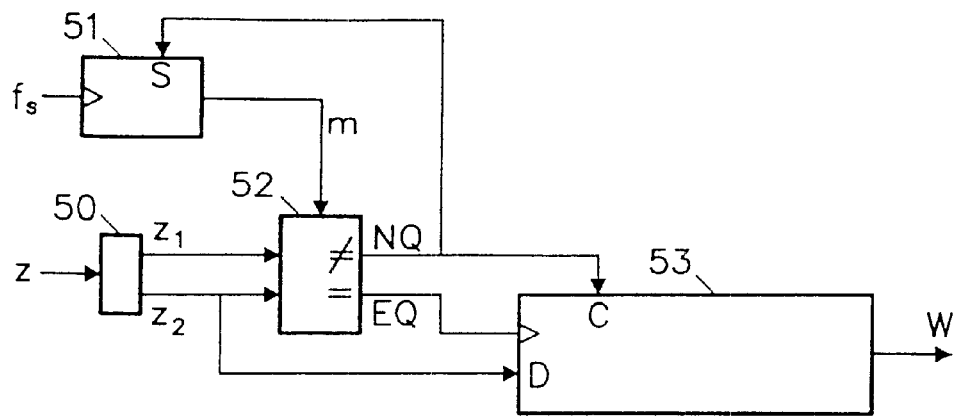
FIG. 5 shows a schematic diagram of an embodiment of an arrangement for extracting the supplemental data from a signal.

FIG. 5 shows a schematic diagram of a hardware implementation of an arrangement for extracting the supplemental data from the bit stream z which is produced by the encoder shown in FIG. 1. The arrangement comprises a demultiplexer 50 for demultiplexing the audio bit stream z into the bit stream $z_1$ representing the left audio channel and the bit stream $z_2$ representing the right audio channel. The arrangement further comprises a divide-by-M counter 51. Every $M^{th}$ bit period, said counter produces a timing pulse representing a current bit position m (m=0 . . . M−1) being tested. The bit streams $z_1$ and $z_2$ are applied to a comparator 52. In response to the timing pulse m, the comparator produces a pulse EQ if the currently applied bits are the same, or a pulse NQ if they are different.

If the bits are the same, they are potential watermark bits. In that case, the potential watermark bit $z_2$ (or $z_1$) is shifted in a shift register 53 in response to the EQ pulse. The next timing pulse now occurs M bit periods later. Thus, as long as every $M^{th}$ bit of $z_1$ and the corresponding bit of $z_2$ are identical, that particular bit is shifted in the shift register. If the bits are not the same, the comparator 52 produces the pulse NQ. This pulse is applied to a shift input S of the counter 51 so as to shift the phase of this divide-by-M counter by one bit period. The pulse NQ is also applied to a clear input C of the shift register 53 to clear the register.

The arrangement shown in FIG. 5 is simple and cost-effective but has the disadvantage that a relatively long period of time must be observed until it may be assumed that the watermark bit position has been found, and that the watermark message has not fully been acquired from the beginning. The expected time to be observed until the arrangement has found the watermark bit position depends on the number of bits (M) by which the watermark bits are spaced apart and the probability (p) that the bits in both channels are identical (p≈½ for sigma-delta-modulated audio signals). The expected period of time until a false lock is recognized is:

$$T_{false} = Mp \sum_{k=0}^{\infty} k(1-p)^k = \frac{Mp}{1-p}$$

The average period of time to detect the watermark bit position is:

$$T_{lock} = \frac{M^2 p}{2(1-p)}$$

Using a number of parallel detection circuits, each processing a displaced sequence of potential watermark bits, can accelerate the detection and extraction of the watermark.

Figure 6:
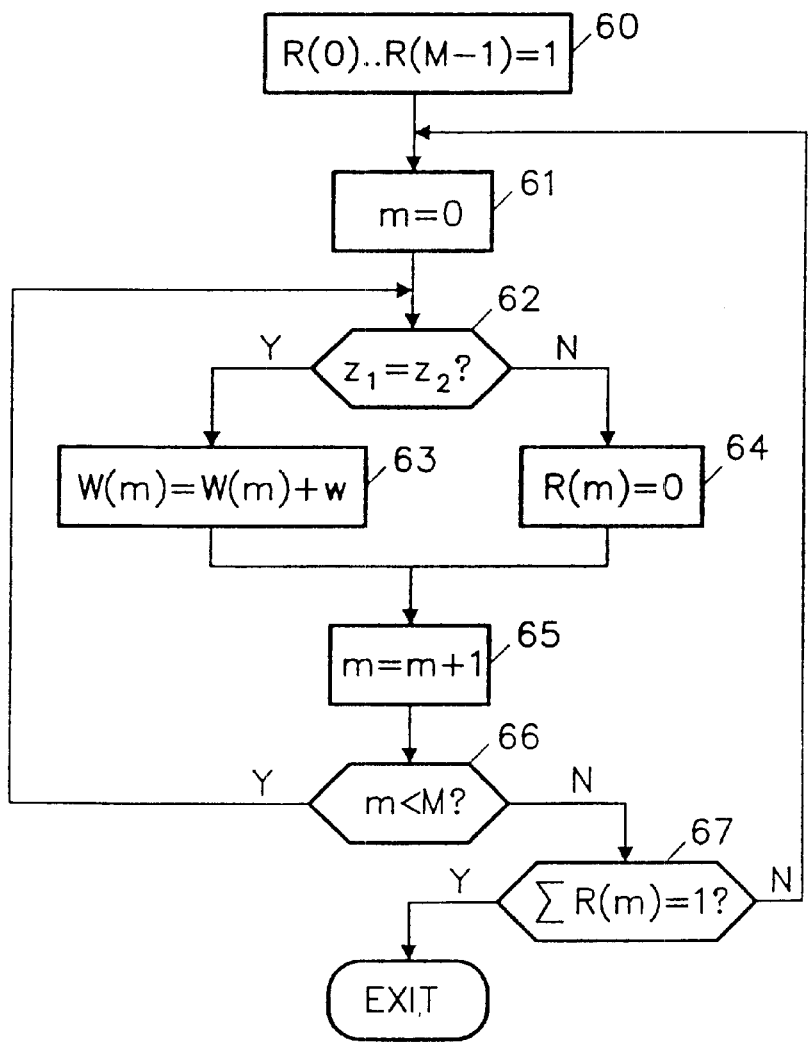
FIG. 6 shows a flow chart of method steps to illustrate an embodiment of a method of extracting the supplemental data from a signal.

The detection and extraction of the watermark can also be performed by a microprocessor which is loaded with a suitable software program. FIG. 6 shows a flow chart of operation steps that are carried out by such a microprocessor in accordance with a further embodiment of the arrangement. It is again assumed that every $M^{th}$ bit of each channel bit stream is a watermark bit.

The microprocessor uses for each bit position m (m=0 . . . M−1, see FIG. 4) an array element R(m) to indicate whether a potential watermark bit on said bit position has been detected (R(m)=1) or not (R(m)=0). In a first step 60 of the program, all array elements R(0) ... R(M−1) are initially given the value 1. In a step 61, the bit position m being tested obtains an initial value 0. The program then awaits the reception of a new bit from the channel bit streams $z_1$ and $z_2$. In a step 62, both bits are compared. If they are identical, an optional step 63 is carried out which will be described later. The corresponding array element R(m) remains unaffected. If the channel bits are not identical, the corresponding array element R(m) is given the value 0 (step 64) to indicate that the current bit position m is definitely not the watermark bit position being looked for. In a step 65, the bit position is incremented. In step 66, it is checked whether the incremented bit position is still within the range 0 ... M−1. If that is the case, the program returns to the step 62 to test the next bit position. If that is not the case, the program first performs an optional step 67, which will be described later, and then returns to the step 61 (in which the bit position number m is reset) to test the next series of M channel bits.

After the first series of M channel bits has been processed in this manner, a number of bit positions have already been found not to be watermark bit positions. With reference to the example shown in FIG. 4, this applies to bit positions 1, 5 and 7. The corresponding array elements R(1), R(5) and R(7) have now obtained the value 0 and will not be modified anymore, even if the bits at said positions will later be the same.

Whenever a series of M channel bits is processed, a further number of bit positions will be excluded from being a candidate watermark bit position. In the example shown in FIG. 4, the bit positions 0, 4, 8 and 9 will be excluded during the second run, bit position 6 will be excluded during the third run, and, finally, bit position 3 will be excluded during the fourth run. The arrangement has now identified the watermark bit position m=2 in this simple example.

The method shown in FIG. 6 has detected the watermark bit position m as soon as one array element R(m) has the value 1 and all other array elements have the value 0. To signify this, the program further includes the processing step 67 in which it is tested whether the sum of all array elements is 1. The processing step 67 may be located at various places of the program. In this example, the test is carried out when the bit position m has assumed the value M, i.e. whenever a series of M candidate bit positions has been processed.

The acquisition of the watermark data message may be postponed until the watermark bit position has been found. However, it is possible to acquire the watermark message while the search for its position is running. To this end, the arrangement includes a further array W in which each candidate watermark message received so far is acquired. To this end, the program shown in FIG. 6 includes the step 63 in which the received watermark bit w is added to the currently received message. As soon as the watermark bit position m has been found, the corresponding array element W(m) has already acquired the watermark message received so far.

It should be noted that the arrangement for detecting the watermark bit positions can further be extended to check whether an accidental shift has occurred in one of the channels. For example, if the watermark is embedded in three or more channels, the arrangement can be arranged to search for the offset of one of the channels. Or the arrangement is arranged to intentionally introduce a shift in one of the channels if the watermark has not been identified in a predetermined portion of the signal or within a predetermined period of time.

Although the invention has been described with reference to a sigma-delta-modulated (unity-bit coded) two-channel audio signal, it is not limited to audio or unity-bit coded signals. The signal samples may be multi-bit samples (e.g. PCM samples), the watermark being embedded in one or more less significant bits of said samples. The coding algorithm is irrelevant (it may, for example, be pulse code modulation), nor is it required that the step of embedding the supplemental data is carried out within the feedback loop of an encoder. The essential feature of this invention is that the same supplemental data samples are embedded at corresponding positions of two or more channels of a multi-channel information signal.

In summary, a method and an arrangement are disclosed for embedding supplemental data in an information signal such as a sigma-delta-modulated audio signal. The encoded signal includes two or more channels, e.g. a left channel bit stream ($z_1$) and a right channel bit stream ($z_2$). The same supplemental data (w) is accommodated at corresponding predetermined bit positions, e.g. every $M^{th}$ bit position, of the bit streams. This allows detection and extraction of the supplemental data without the need for accommodating a sync pattern in the signal. At the receiving end, a sequence of $M^{th}$ bits from the first channel is compared with a corresponding sequence of $M^{th}$ bits from the second channel. If they are identical, the sequence is a candidate supplemental data sequence. This is done for different sequence positions (m) until the supplemental data has been found.

What is claimed is:

1. A method comprising the steps of:
    receiving an information signal comprising at least a first and a second channel each having identical supplemental data samples embedded at signal sample positions,
    comparing a first sequence of predetermined samples of the first channel signal, with a corresponding second sequence of samples of the second channel signal; and
    displacing the first and second sequence by one sample position, and repeating the comparison when the sequences are not identical.

2. The method of claim 1, further comprising the step of storing the signal data samples of the sequences being compared when the sequences are identical.

3. The method of claim 1 wherein the samples of supplemental data in the sequence in the first.channel are spaced apart by a predetermined number of samples of the first channel signal.

4. An arrangement comprising:
    means for simultaneously receiving at least a first and a second channel having identical supplemental data samples embedded at signal sample positions;
    means for comparing a first sequence of predetermined first channel signal samples with a corresponding second sequence of second channel signal samples, and
    means for displacing the first and second sequence by one sample position, and repeating the comparison step for the displaced first and second sequence when the sequences are not identical.

5. A device for reproducing an information signal from a media, comprising:
    means for reading from a media an information signal including at least a first and a second channel having identical supplemental data samples embedded at signal sample positions;
    means for comparing a first sequence of predetermined first channel signal samples with a corresponding second sequence of second channel signal samples, and means for displacing the first and second sequence by one sample position, and repeating the comparison step for the displaced first and second sequence when the sequences are not identical.

6. A device for recording and reproducing an information signal on a media, comprising:

means for receiving multiple signal channels;

means for embedding the same supplemental data samples at corresponding predetermined positions in at least two of the channels;

means for combining the channels containing the embedded supplemental information into the same information signal;

means for recording the information signal on the media and reproducing the information signal from the media;

means for comparing a first sequence of predetermined first channel signal samples with a corresponding second sequence of second channel signal samples in the reproduced signal, and means for displacing the first and second sequence by one sample position, and repeating the comparison step for the displaced first and second sequence when the sequences are not identical.

* * * * *